A. B. CASE.
LAWN MOWER.
APPLICATION FILED JAN. 28, 1909.
960,503.
Patented June 7, 1910.
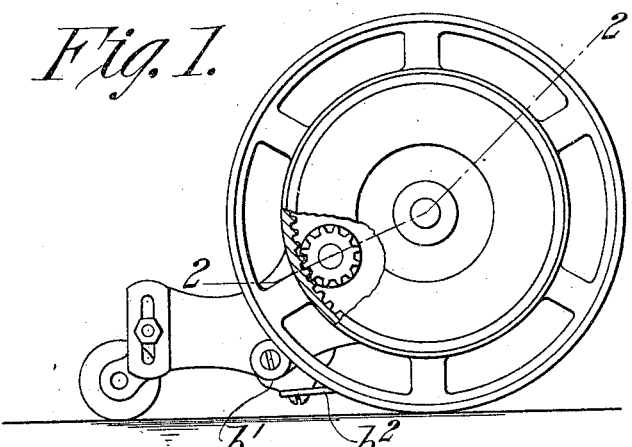
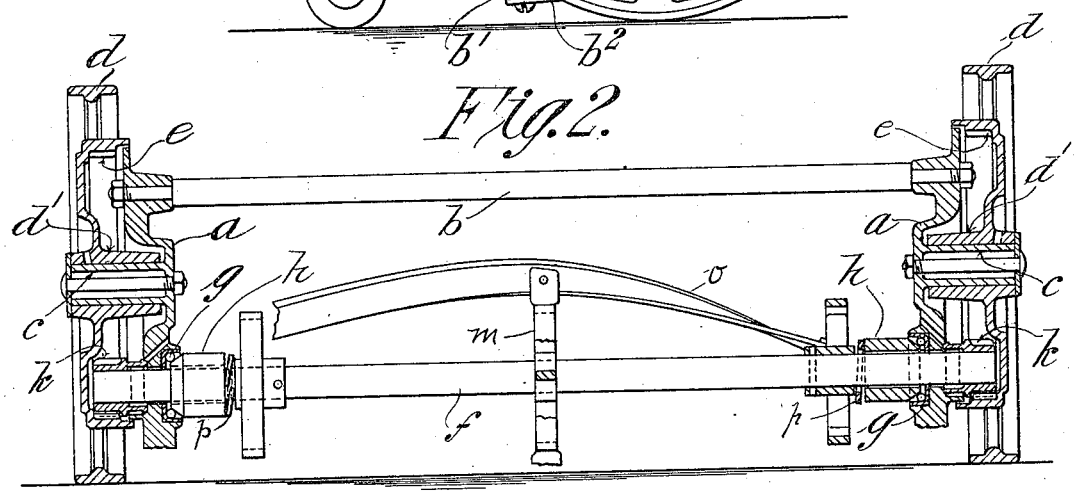
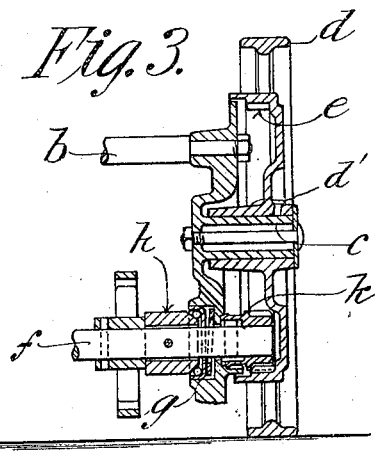
WITNESSES:
H. L. Sprague
Harry W. Bowen
INVENTOR,
Adelbert B. Case,
BY Chapin Geo.
ATTORNEY.

UNITED STATES PATENT OFFICE.

ADELBERT B. CASE, OF SPRINGFIELD, MASSACHUSETTS.

LAWN-MOWER.

960,503.  Specification of Letters Patent.  Patented June 7, 1910.

Application filed January 28, 1909. Serial No. 474,722.

*To all whom it may concern:*

Be it known that I, ADELBERT B. CASE, a citizen of the United States of America, residing at Springfield, in the county of Hampden and State of Massachusetts, have invented new and useful Improvements in Lawn-Mowers, of which the following is a specification.

This invention relates to lawn mowers, and the object thereof is to provide a cutter-shaft for such machines embodying automatically adjusting bearings and also means to so counterbalance the shaft in its bearings as to confine it against longitudinal movement regardless of the movement of any part of the self-adjusting bearings of said shaft.

On October 29, 1907, a patent numbered 869,771 was issued to me for an improvement in lawn mower construction which embodied a cutter-shaft having bearings in the side-plates of the frame, which bearings comprised a tapered bearing surface and a supporting element therefor, and means to maintain a yielding contact between said bearing surface and said supporting element. This effect was accomplished by putting a stiff spring member between an abutment on the shaft and a cone slidable on the latter, yieldingly held in bearing contact with a supporting surface, for instance,—a set of balls,—by the expansive action of said spring. An alternative construction was shown and described in which the cone was fixed to the shaft, and the spring was placed behind the ball-cup, the abutment in that case being the frame of the machine. In either case, the expansive action of the spring would result in imparting endwise movement to the cutter-shaft during any self-adjusting movement of the bearing elements, due either to the change of relation of one side of the frame relative to the other or to any wear in the contacting bearing surfaces. The use of the many lawn mowers embodying the invention covered by my aforesaid prior patent has emphasized the fact that this end play of the cutter-shaft, though relatively of limited range, is undesirable inasmuch as it may allow the end of the shaft to bear against the driving wheels of the mower, or it may cause the ends of the teeth of the pinion on said shaft to come into improper contact with an adjacent part of the machine as will be fully explained further on. Furthermore, such endwise movement of the cutter-shaft might cause the pawl of the ratchet device located in the pinion on said shaft to bind.

The present invention provides a construction and arrangement of cutter-shaft and bearings therefor whereby substantially all movement of the shaft endwise is eliminated, all as fully described hereinafter; and when the lawn mower is assembled at the factory the cutter-shaft is adjusted for all time, and in fact no provision is made whereby its adjustment can be altered, the only adjustment possible being the setting of the stationary knife toward and from the shaft of the rotary cutter. Another advantage in holding the rotary cutter against longitudinal movement is that the edge of the stationary knife never assumes a wavy edge, as is the case when there is endwise play of the cutter-shaft, and if any depression is worn in the edge of the stationary knife, when the latter is adjusted to the cutter, said depression would exactly fit the slight protuberance of the edge of the cutter which caused it.

The invention is illustrated in the accompanying drawings, in which,—

Figure 1 is a side elevation of a lawn mower, a part of the frame being broken away. Fig. 2 is a longitudinal section in a plane indicated by the line 2—2, Fig. 1. Fig. 3 is a section of one end of a lawn mower in the same plane as shown in Fig. 2, but embodying a slight change in the relation of the parts of the bearing as compared with Fig. 2.

In these different figures, $a$, $a$ represent the two side plates of the frame of a lawn mower secured together by the rod $b$ and the bar $b^1$ on which the stationary knife $b^2$ is secured, the latter, however, being shown only in Fig. 1, it being the well known frame construction, whereby the side-plates $a$ are maintained in substantial parallelism.

Each side plate has a projection $c$ cast thereon on which the driving-wheels are supported. These driving-wheels, the traction rim of which is indicated by $d$, have each cast therewith a circular flange, the internal surface of which is a rack $e$. A long hub $d^1$ on the driving-wheels fits the projection $c$.

The cutter-shaft is indicated by $f$ and is supported in bearings in the side-plates consisting, as generally constructed, of a ball-cup $g$ located in a recess in the side-plates and having balls therein against which the cone $h$ on the shaft bears. The bearings for each end of the shaft are identical. The ends of the cutter-shaft extend through the bearings and side-plates into the recess formed on the driving-wheels by the flanged rack $e$ and on each end of the shaft is a driving pinion $k$ provided with the well known pawl and ratchet device whereby it is operatively connected with the shaft, said pinion meshing with the teeth of said rack in the driving wheel.

Each of the cones $h$ is loose on the shaft $f$ in the construction shown in Fig. 2, (which is the preferred construction) and located on the shaft between the inner end of each of the cones and a suitable abutment on the shaft (which in this case are the hubs of the spiders $m$ fixed rigidly on the shaft) is located a stiff spring $p$, preferably in the form of a spiral spring washer. The spiders $m$ referred to carry the spiral cutter-blades $o$ secured thereto in the usual manner.

When the shaft and its bearings are placed in the assembled frame of the mower consisting of the side-plates $a$, the tie-rod $b$, and stationary knife-bar $b^1$, the springs $p$ are compressed to the proper tension. The pinions are then applied to the ends of the cutter shaft and the driving-wheels mounted on their hubs.

When the machine is thus assembled, the springs $p$ exert pressure in opposite directions, one in opposition to the other. Each spring acts in one direction against the loose cone to hold the tapered bearing end thereof in yielding contact with its seat on the balls in the cups $g$, and in the other direction against the hubs of the spiders $m$, and thus in their action in the last named direction, the springs oppose each other, and as they are of as nearly equal resiliency as possible it follows that when the cones are seated in their bearings any change in the relation of one side plate relative to the other, or any wear in either of the bearings will result in a movement of the cones simultaneously to make up for any change of position of the seat of one relative to the other, for the reason that means are provided at each end of the shaft to follow up the slightest movement between one of the elements of the bearings and another, and this following up movement is effected by the constant expansive action of the springs $p$, each having a fixed abutment, the thrust against which is in opposition to the contact of the other spring, and these opposing forces being equal and opposite in direction, tend to hold the shaft in a fixed position and against any longitudinal movement.

When only one spring $p$ is used, as in my said prior patent, it is obvious that should any wear occur in the bearing of that end of the shaft $f$ which carries the fixed cone, the whole shaft will be permitted to move endwise, which would result eventually either in the contact of that end of the shaft with the driving-wheel or more probably the contact of the ends of the teeth of the pinions $k$ with the bottom of the cup-shaped recess formed by the rack $e$, and the body of the driving-wheel. On the other hand, the mounting of the cutter-shaft (which normally has free endwise play) between two springs, as $p$, whose expansive action is applied so as to act in opposite direction on each end portion of the shaft and endwise thereof, will result in holding the shaft in an approximately fixed position and against any longitudinal movement, regardless of wear of either or both bearings, or of any racking or working of the frame parts supporting the bearings.

Obviously, the action of the parts would be the same in all respects if the springs $p$ were located, as shown in Fig. 3, back of the ball-cups $g$ which would be spring-pressed thereby toward the tapered end of the cones $h$ fixed on the shaft $f$ to maintain a constant yielding pressure between the parts of the bearing.

What I claim, is:—

1. A cutter-shaft for lawn mowers and suitable bearings for the ends thereof, each bearing comprising a member having a tapered bearing surface and a member in which said surface is seated, fixed abutments on the cutter-shaft, a spring located between each bearing and one of said abutments to apply constant endwise pressure to each end of said shaft in opposed directions to hold said members of the bearing in operative relation one to the other, and to substantially maintain said shaft in a fixed position and against longitudinal movements.

2. A rotary cutter-shaft for lawn-mowers, and a bearing for each end of the shaft, a frame comprising side-plates in which said bearings are located, said bearings each comprising two members,—one movable toward the other,—fixed abutments on the shaft, and springs under compression and pressing against said abutments and associated with each bearing to hold said bearing members in operative relation one to the other, one of the abutments against which the action of the springs is exerted being on the shaft, whereby the latter is yieldingly maintained always in a fixed position and against longitudinal movements.

3. The combination with the frame of a lawn mower, of a rotary cutter-shaft, bearings for each end thereof comprising a ball-cup and balls seated in the frame, loose cones on the shaft, fixed abutments on the shaft, and a spring located between the end of each cone and one of said abutments to yieldingly hold the cones to their seats against the said balls, whereby endwise pressure is exerted against the shaft from each end longitudinally to position the shaft, substantially as described.

4. An automatic cutter-shaft adjusting device for lawn mowers having in combination with the side frames of the mower, a movable member on each end of said shaft, resilient means for independently moving said movable members in opposite directions, a bearing element located in each of said side frames to receive the ends of the shaft, the movable members engaging said bearing elements, whereby the resilient members will maintain the shaft in substantially a fixed position, as described.

5. The combination with the bearing elements of the opposite ends of the cutter-shaft of a lawn mower, adjustable cone members mounted on said shaft, abutments on said shaft, resilient means for moving said cone members in opposite directions toward said bearing elements and engaging the abutments whereby the longitudinal position of the shaft may be constantly maintained, as described.

6. In a lawn mower, the combination with the side frames thereof, a ball-bearing construction for the shaft mounted in each of said side frames, a movable cone member located on each end of said shaft and engaging the ball-bearing, and resilient means for moving said cone-members in opposite directions, whereby the shaft is constantly maintained in a fixed position of adjustment longitudinally considered.

ADELBERT B. CASE.

Witnesses:
K. I. CLEMONS,
HARRY W. BOWEN.